US012212526B2

(12) United States Patent
Liu et al.

(10) Patent No.: US 12,212,526 B2
(45) Date of Patent: Jan. 28, 2025

(54) REDUCING AN INTERFERENCE BETWEEN CHANNELS ENABLING COMMUNICATION BETWEEN A SATELLITE AND A WIRELESS TELECOMMUNICATION NETWORK

(71) Applicant: T-Mobile USA, Inc., Bellevue, WA (US)

(72) Inventors: Jun Liu, Sammamish, WA (US); Jeff Ahmet, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 341 days.

(21) Appl. No.: 17/670,328

(22) Filed: Feb. 11, 2022

(65) Prior Publication Data

US 2023/0261847 A1 Aug. 17, 2023

(51) Int. Cl.
| | |
|---|---|
| *H04B 7/00* | (2006.01) |
| *H04L 5/00* | (2006.01) |
| *H04W 16/14* | (2009.01) |
| *H04W 24/02* | (2009.01) |
| *H04W 48/16* | (2009.01) |

(Continued)

(52) U.S. Cl.
CPC .......... *H04L 5/0073* (2013.01); *H04L 5/0094* (2013.01); *H04W 16/14* (2013.01); *H04W 48/16* (2013.01); *H04W 72/0453* (2013.01); *H04W 72/541* (2023.01)

(58) Field of Classification Search
None
See application file for complete search history.

(56) References Cited

U.S. PATENT DOCUMENTS

| | | |
|---|---|---|
| 5,884,145 A | 3/1999 | Haartsen |
| 7,177,598 B2 | 2/2007 | Klein et al. |

(Continued)

FOREIGN PATENT DOCUMENTS

| | | |
|---|---|---|
| CN | 108540178 A | 9/2018 |
| CN | 110167166 A | 8/2019 |

(Continued)

OTHER PUBLICATIONS

International Searching Authority, International Search Report and Written Opinion, PCT Patent Application PCT/US2023/061301, mailed May 10, 2023, 13 pages.

*Primary Examiner* — Sithu Ko
(74) *Attorney, Agent, or Firm* — Perkins Coie LLP (57) ABSTRACT

The system monitors multiple communication channels between a first communicator and a second communicator. At least a portion of the multiple channels spatially overlap. The overlapping channels carry different communications. The system determines whether a first set of two or more channels among the multiple channels are interfering with each other. Upon detecting interference, the system obtains a first multiplicity of physical resource blocks associated with a first channel and a second multiplicity of physical resource blocks associated with a second channel, where a physical resource block comprises a frequency band of predetermined size. The system allocates a first subset of the first multiplicity of physical resource blocks to the first channel, and a second subset of the second multiplicity of physical resource blocks to the second channel, where the first subset and the second subset do not overlap.

17 Claims, 8 Drawing Sheets

(51) Int. Cl.
*H04W 72/0453* (2023.01)
*H04W 72/541* (2023.01)

(56) References Cited

U.S. PATENT DOCUMENTS

| | | | |
|---|---|---|---|
| 8,175,538 B1 | 5/2012 | Chen et al. | |
| 8,774,084 B2 | 7/2014 | Palanki et al. | |
| 8,897,236 B2 | 11/2014 | Yoo et al. | |
| 8,934,432 B2 | 1/2015 | Zheng et al. | |
| 8,964,871 B2 | 2/2015 | Mobasher et al. | |
| 9,008,585 B2 | 4/2015 | Xiao et al. | |
| 9,084,241 B2 | 7/2015 | Madan et al. | |
| 9,198,070 B2 | 11/2015 | Krishnamurthy et al. | |
| 9,198,181 B2 | 11/2015 | Blankenship et al. | |
| 9,265,040 B2 | 2/2016 | Dinan | |
| 9,473,982 B2 | 10/2016 | Goldhamer | |
| 9,730,245 B2 | 8/2017 | Li et al. | |
| 10,004,087 B2 | 6/2018 | Sabapathi et al. | |
| 10,075,962 B2 | 9/2018 | Gresset | |
| 10,084,524 B2 | 9/2018 | Guan et al. | |
| 10,275,685 B2 | 4/2019 | Hu et al. | |
| 10,827,459 B2 | 11/2020 | Lee et al. | |
| 10,966,153 B2 | 3/2021 | Heiska et al. | |
| 10,993,215 B2 | 4/2021 | Hosseini et al. | |
| 11,051,279 B2 | 6/2021 | Bagheri et al. | |
| 11,109,372 B2 | 8/2021 | Rico Alvarino et al. | |
| 2008/0225792 A1 | 9/2008 | Naguib et al. | |
| 2013/0039299 A1 | 2/2013 | Papasakellariou et al. | |
| 2014/0369450 A1* | 12/2014 | Leyh | H04B 1/109 375/346 |
| 2015/0063201 A1* | 3/2015 | Kim | H04B 7/0617 370/316 |
| 2016/0182152 A1 | 6/2016 | Sofman et al. | |
| 2017/0181160 A1 | 6/2017 | Corbel et al. | |
| 2017/0272131 A1* | 9/2017 | Ananth | H04B 7/0413 |
| 2017/0294996 A1* | 10/2017 | Lee | H04W 72/51 |
| 2018/0103381 A1* | 4/2018 | Ramamurthi | H04W 36/0016 |
| 2019/0090141 A1* | 3/2019 | Fujii | H04W 16/14 |
| 2019/0158173 A1* | 5/2019 | Regunathan | H04B 7/18513 |
| 2019/0260465 A1* | 8/2019 | Baudoin | H04B 7/2041 |
| 2019/0327746 A1 | 10/2019 | Porat et al. | |
| 2020/0041658 A1* | 2/2020 | Laurichesse | G01S 19/44 |
| 2020/0053580 A1 | 2/2020 | Bagheri et al. | |
| 2020/0059294 A1 | 2/2020 | Qin et al. | |
| 2020/0120691 A1 | 4/2020 | Siomina et al. | |
| 2020/0154449 A1 | 5/2020 | Akkarakaran et al. | |
| 2020/0178351 A1 | 6/2020 | Davydov et al. | |
| 2020/0213998 A1 | 7/2020 | Sun et al. | |
| 2020/0229179 A1 | 7/2020 | Fan et al. | |
| 2020/0374091 A1 | 11/2020 | Shao et al. | |
| 2020/0403768 A1 | 12/2020 | Manolakos et al. | |
| 2021/0037525 A1 | 2/2021 | Xu et al. | |
| 2021/0044981 A1 | 2/2021 | Bhattad et al. | |
| 2021/0050964 A1 | 2/2021 | Manolakos et al. | |
| 2021/0067220 A1 | 3/2021 | Abdelghaffar et al. | |
| 2021/0167820 A1* | 6/2021 | Singh | H04B 7/18595 |
| 2022/0240258 A1* | 7/2022 | Sevindik | H04W 72/541 |
| 2023/0198634 A1* | 6/2023 | Orús Lacort | G06N 10/20 380/256 |

FOREIGN PATENT DOCUMENTS

| | | |
|---|---|---|
| CN | 110351840 A | 10/2019 |
| CN | 111836377 A | 10/2020 |
| CN | 109714129 B | 2/2021 |
| CN | 112584515 A | 3/2021 |
| CN | 113366775 A | 9/2021 |
| EP | 3282764 B1 | 5/2020 |
| EP | 3753196 A1 | 12/2020 |
| JP | 2021501521 A | 1/2021 |
| WO | 2014067370 A1 | 5/2014 |
| WO | 2015163642 A1 | 10/2015 |
| WO | 2015168865 A1 | 11/2015 |
| WO | 2018071026 A1 | 4/2018 |
| WO | 2018127027 A1 | 7/2018 |
| WO | 2018127028 A1 | 7/2018 |
| WO | 2018208216 A1 | 11/2018 |
| WO | 2020140289 A1 | 7/2020 |
| WO | 2020150957 A1 | 7/2020 |
| WO | 2020194264 A1 | 10/2020 |
| WO | 2020199976 A1 | 10/2020 |
| WO | 2020239217 A1 | 12/2020 |
| WO | 2020244384 A1 | 12/2020 |
| WO | 2020247033 A1 | 12/2020 |
| WO | 2021007787 A1 | 1/2021 |
| WO | 2021021497 A1 | 2/2021 |

* cited by examiner

REDUCING AN INTERFERENCE BETWEEN CHANNELS ENABLING COMMUNICATION BETWEEN A SATELLITE AND A WIRELESS TELECOMMUNICATION NETWORK

BACKGROUND

Satellite communications play a vital role in modern life. There are over 2000 artificial satellites in use. They can be found in geostationary, Molniya, elliptical, and low Earth orbits and are used for traditional point-to-point communications, mobile applications, and the distribution of TV and radio programs. A single satellite antenna can emit hundreds of beams towards hundreds of ground receivers, and a common problem that occurs is destructive interference when two or more beams emitted from the satellite spatially overlap.

Interference is a phenomenon in which two waves superpose to form a resultant wave of greater, lower, or the same amplitude. Constructive and destructive interference result from the interaction of waves that are correlated or coherent with each other, either because they come from the same source or because they have the same or nearly the same frequency. Interference effects can be observed with all types of waves, for example, light and radio waves. Destructive interference occurs when two waves of similar frequency are out of phase with each other, and can cause substantial, or even complete, loss of the communication.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to reduce an interference between two or more channels enabling communication between a satellite and a wireless telecommunication network. The system monitors multiple communication channels between the satellite and the wireless telecommunication network. During monitoring, the system determines whether two or more channels, channel A and channel B, are interfering with each other. Channel A carries a communication that is different from the communication carried by channel B.

The system determines whether channel A and channel B are interfering with each other, by monitoring the signal-to-noise ratio in each channel or packet loss rate reported by the UE. If the signal-to-noise ratio is low, or the packet rate loss is high, the system can determine that channel A and channel B are interfering. If there is no interference, the system does nothing. However, upon determining that there is interference, the system can group channel A and channel B by sending the same communication on both channels.

After the system groups the channels, there can still be interference between the newly grouped channel and other communication channels, or among other communication channels. The system can determine whether other channels, such as channel C and channel D, are interfering with each other. Upon determining that channel C and channel D are interfering with each other, the system obtains a frequency band in which channel C and channel D operate. The system determines the frequency band overlap between channel C and channel D, and creates frequency band C and frequency band D for the two channels, respectively. The frequency band C and the frequency band D do not overlap with each other. By avoiding overlapping in the frequency band, the system reduces interference between channel C and channel D.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
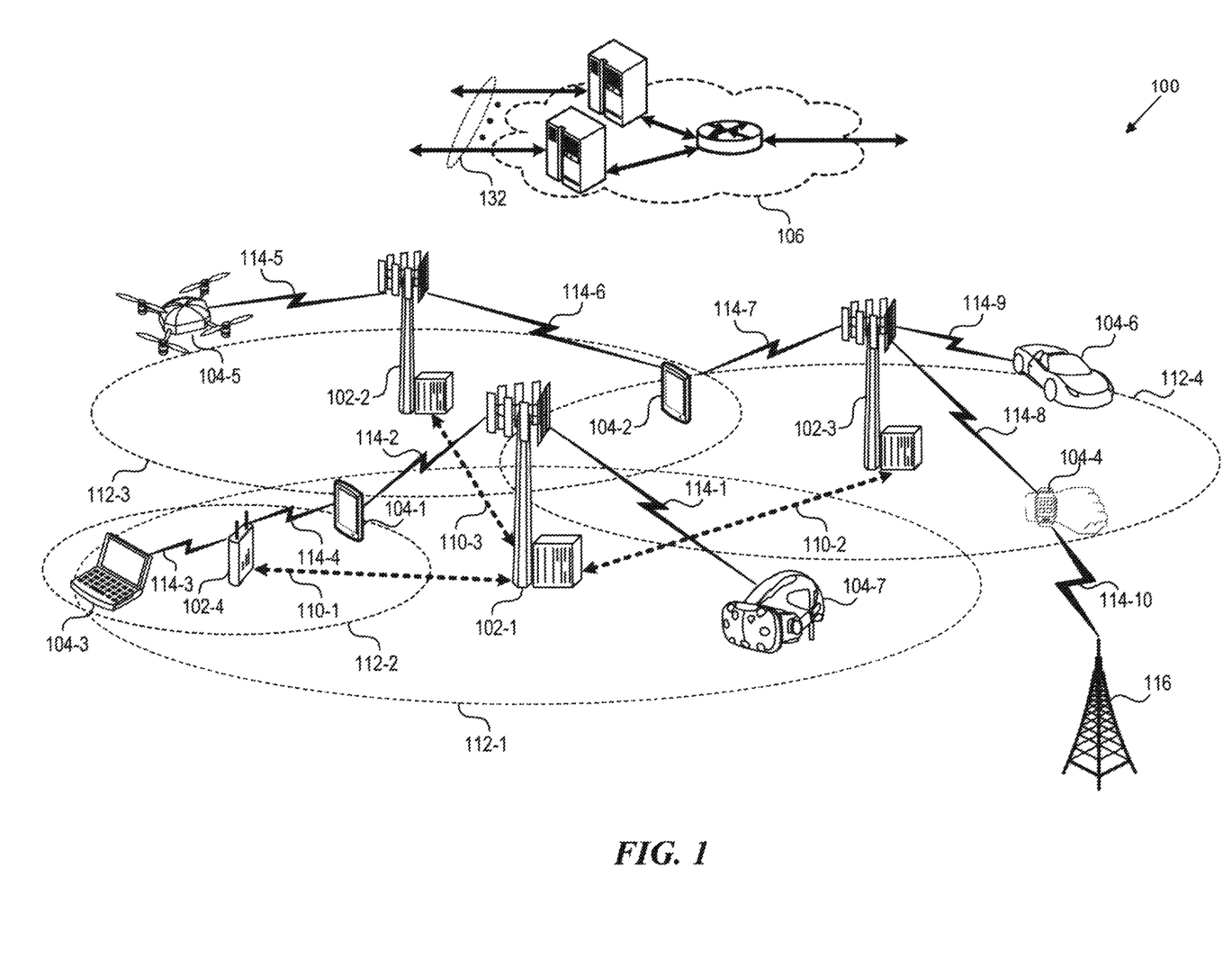
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW)

access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
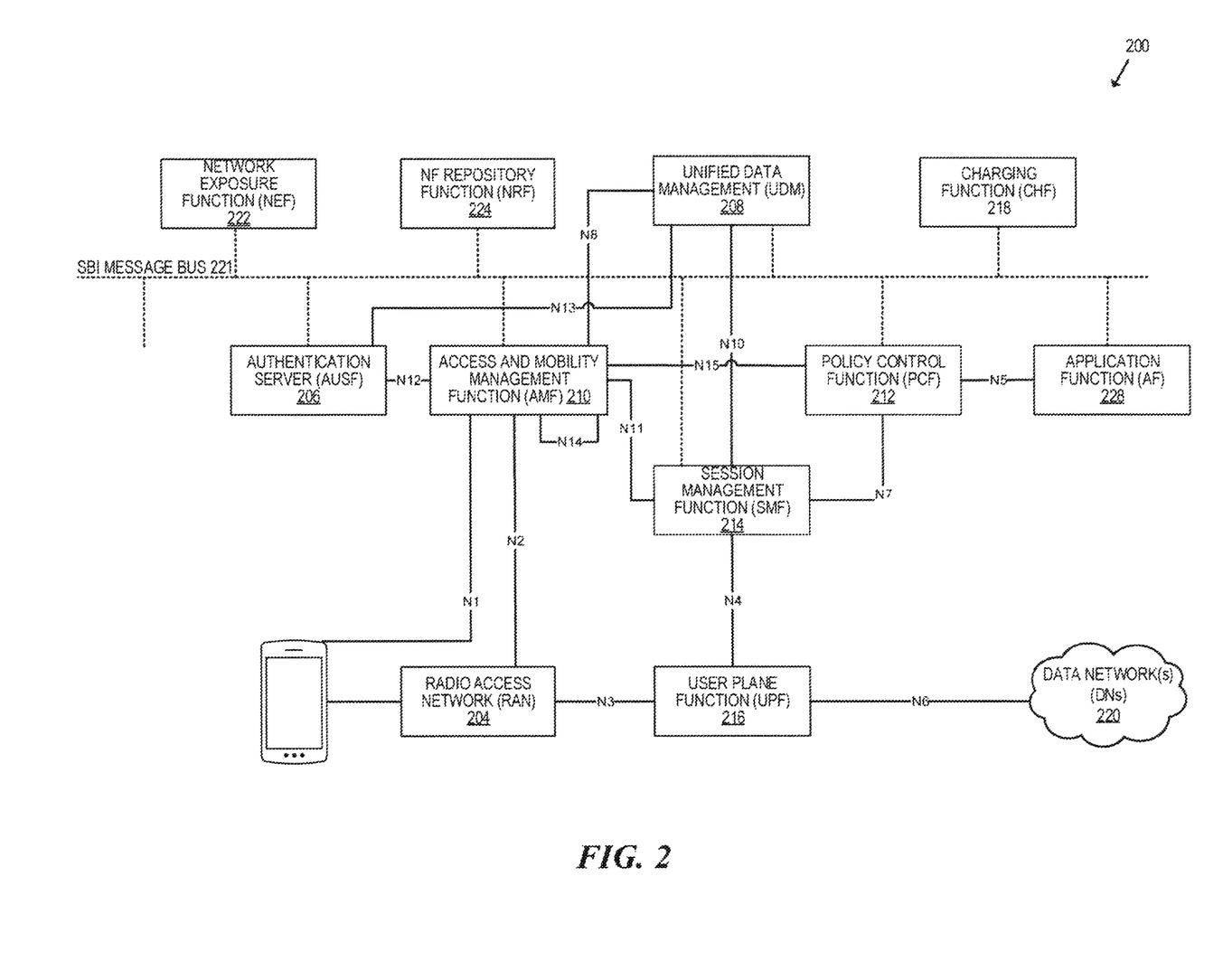
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a random access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
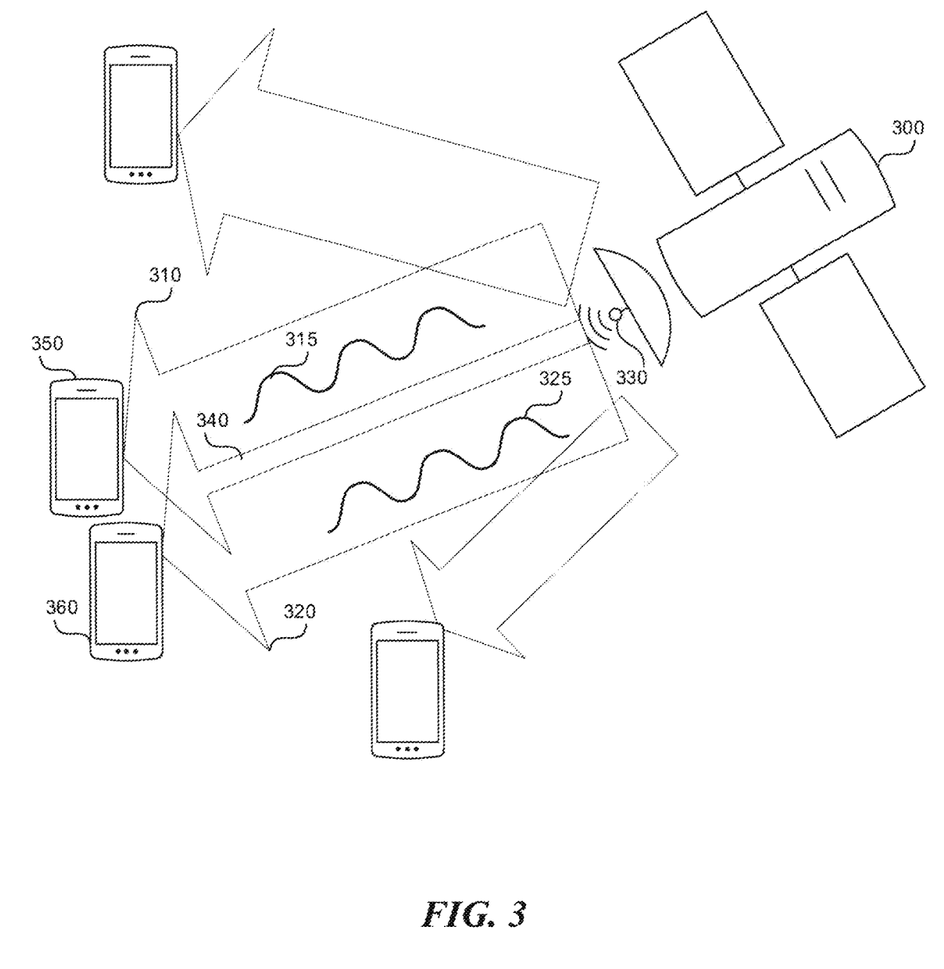
FIG. 3 shows an interference occurring when a satellite communicates with a wireless telecommunication network.

Reducing an Interference Between Channels Enabling Communication Between a Satellite and a Wireless Telecommunication Network FIG. 3 shows an interference occurring when a satellite communicates with a wireless telecommunication network 100 in FIG. 1. The satellite 300 can emit multiple beams 310, 320 (only two labeled for brevity) through multiple channels, such as hundreds of beams, from the same antenna 330 on the satellite. Each beam 310, 320 can carry one or more channels.

The satellite 300 can be several hundred kilometers away from the ground. One beam 310, 320 can be 20 km in diameter. The beams 310, 320 can spatially overlap with each other in the region 340, meaning the beams 310, 320 can communicate different messages at the same time on the same or similar frequency, causing the two communications 315, 325 to destructively interfere with each other. Consequently, the communications reaching the UEs 350, 360 can be garbled due to the interference. A similar problem can occur even without a satellite when a single antenna emits multiple communications with spatial location overlaps.

Figure 4:
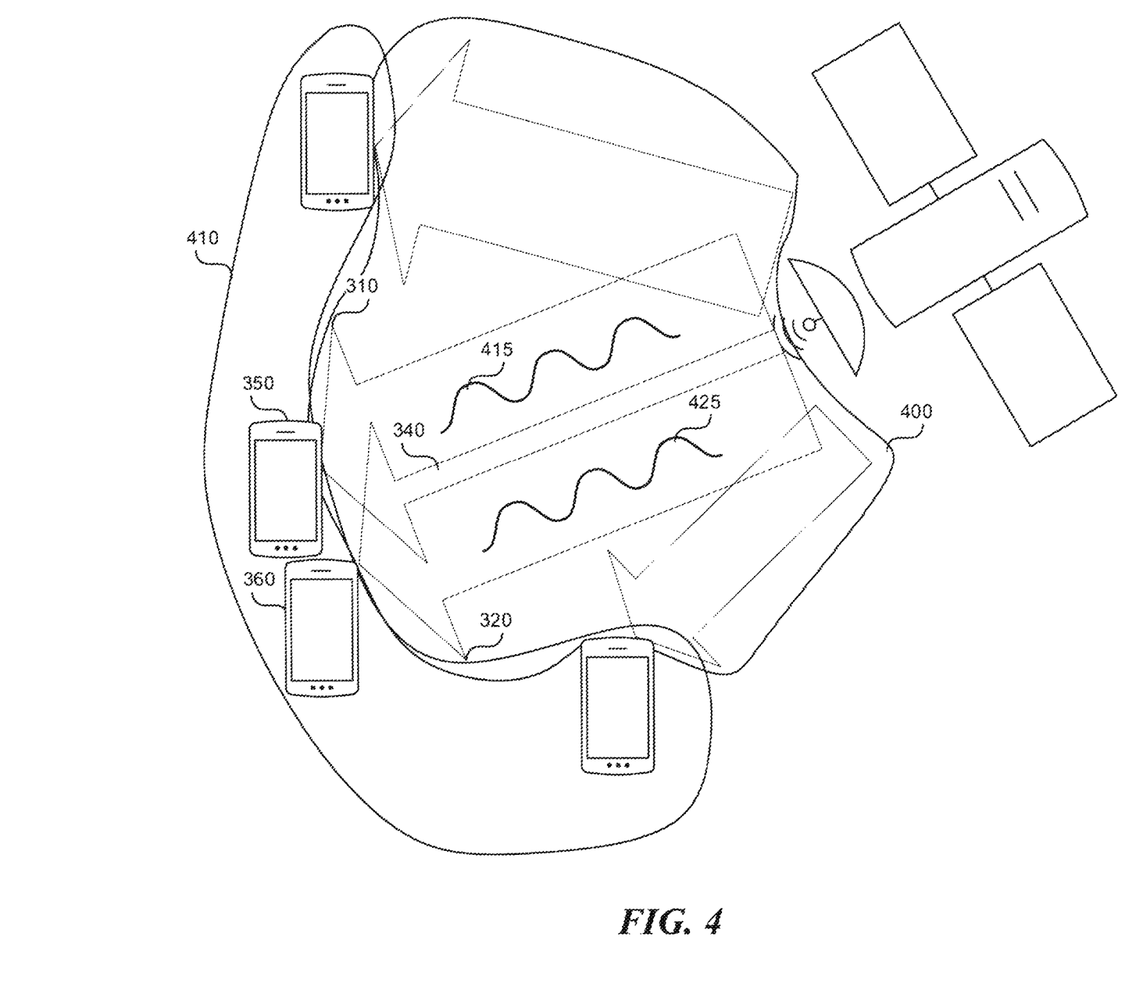
FIG. 4 shows grouping of base stations.

FIG. 4 shows grouping of base stations. To reduce the interference, the network 100 in FIG. 1 can group the overlapping beams 310, 320 and their corresponding UE 350, 360 into a logical beam group 400, and a logical cell group 410, respectively.

All the beams 310, 320 in the logical beam group 400 carry the same communication 415, 425, e.g., the same information. All the cell towers in the network 100 are synchronized to receive the beams at the same time. All beams 310, 320 are synchronized and broadcasting the same information belonging to one logical cell group 410. From the UE's 350, 360 perspective, signals from different beams are from the same logical cell. Consequently, the beams 310, 320 carrying the same communication 415, 425 can constructively interfere with each other, in the overlap region 340, thus amplifying the communication 415, 425 received by the towers 350, 360.

Transmitting the same communication on multiple beams, such as 20 beams, can reduce the capacity of the channel 20 times. However, the loss of interference and the resulting communication quality can justify the capacity reduction. To preserve capacity, the system can dynamically monitor the quality of the communication and the amount of interference and create logical beam groups when necessary.

The logical beam group 400 can include a central beam and beams surrounding the central beam. At the periphery, the logical beam group 400 can overlap with other logical beam groups or single channels, consequently causing interference in the overlap regions. To address the interference, the system can split the frequency spectrum in the overlapping beams.

Figure 5:
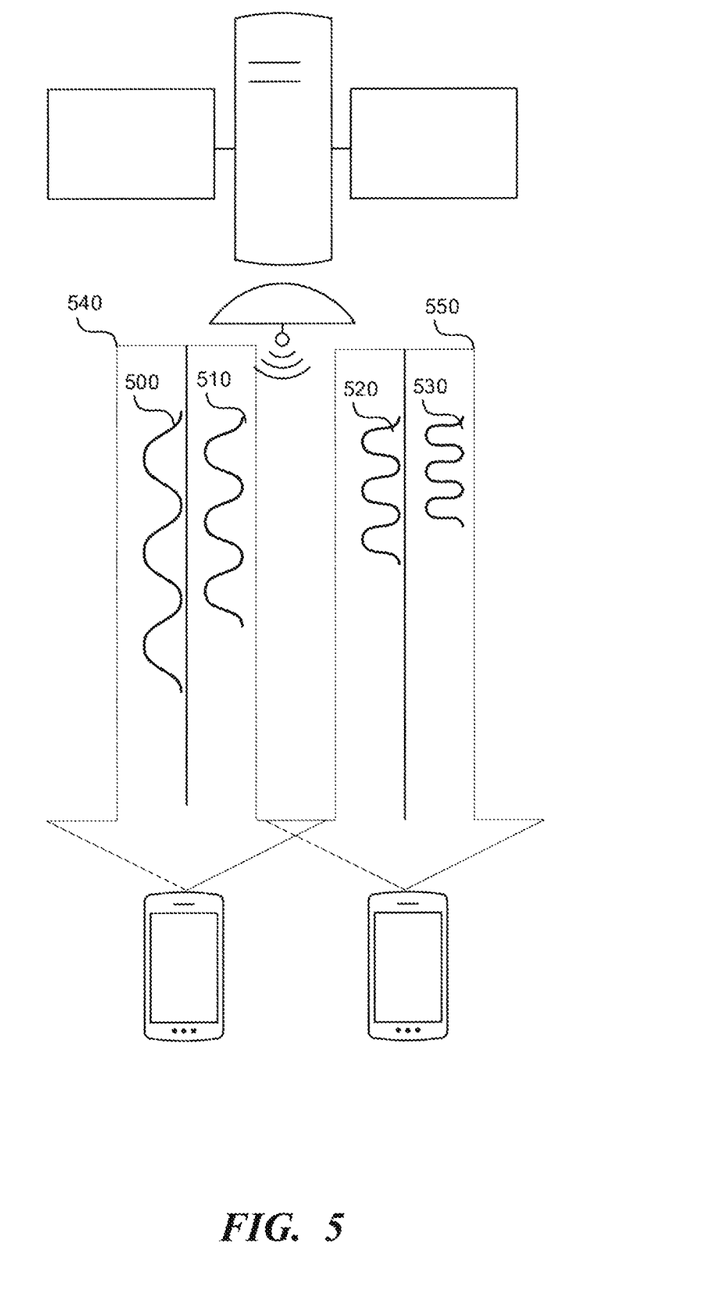
FIG. 5 shows splitting of physical resource blocks.

FIG. 5 shows splitting of physical resource blocks (PRBs). A PRB 500, 510, 520, 530 is a resource in the frequency domain, e.g., a frequency band, of 180 kilohertz. For example, a channel 540, 550 that has a 5 MHz frequency band can include 25 PRBs. If a total of 25 PRBs are used in a channel 540, 550, the PRBs can be numbered from 0 to 24, left to right, in the frequency domain.

If two channels 540, 550 overlap and interfere, the system can use frequency division multiplexing to limit the frequencies in each channel 540, 550. For example, the system can limit channel 540 to use PRBs 0-12, and channel 550 to use PRBs 13-24. Consequently, the overlapping channels 540, 550 do not emit communications in the same frequency, and the destructive interference is reduced.

Figure 6:
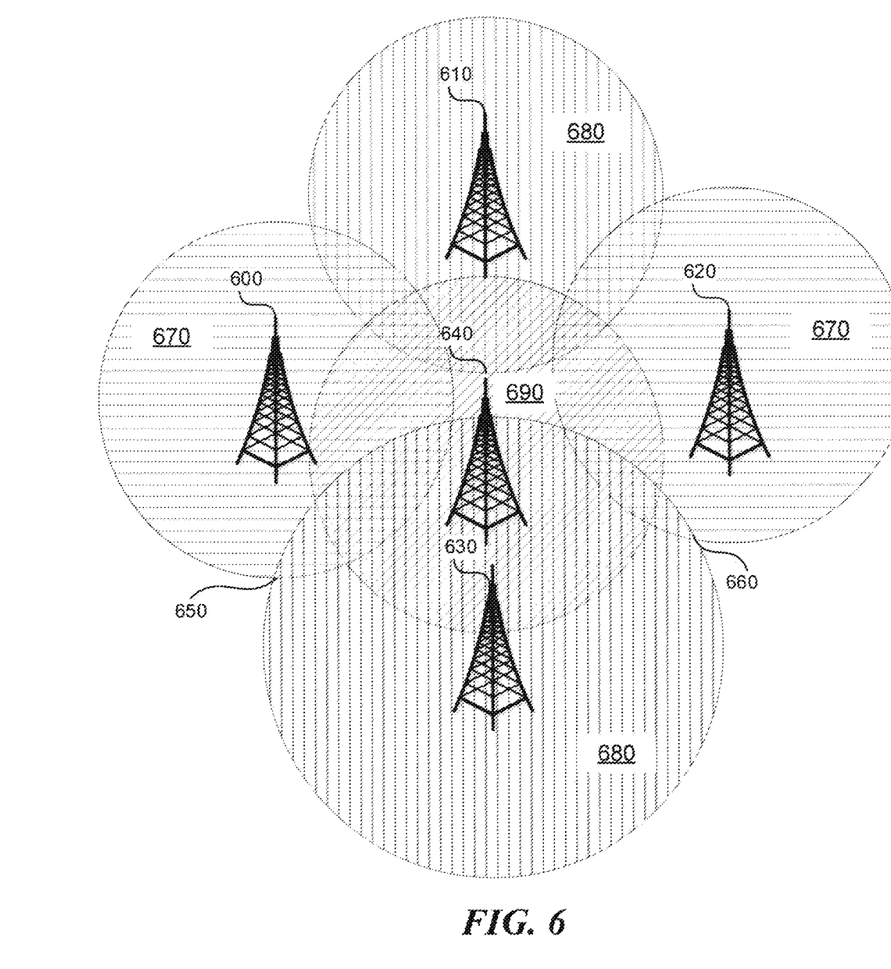
FIG. 6 shows utilizing of base stations based on timeframes.

FIG. 6 shows utilizing of base stations based on timeframes. In addition to using frequency division multiplexing to limit interference, the system can use time division multiplexing.

For example, the base stations 600, 610, 620, 630, 640 can receive five different beams from the satellite 300 in FIG. 3. Consequently, the beams interfere in the overlap areas 650, 660 (only two labeled for brevity). To avoid interference among the base stations 600, 610, 620, 630, 640, the system can group base stations into non-overlapping groups 670, 680, 690. The base stations in each group 670, 680, 690 do not overlap with each other.

The system can, for a first period of time, simultaneously emit beams to all the base stations 600, 620 in a single group 670 because there is no interference among the beams in a single group. Upon the expiration of the first period of time, the system can emit beams to all the base stations 610, 630 in a different group 680 for a second period of time. Upon the expiration of the second period of time, the system can emit beams to all the base stations 640 in the third group 690 for a third period of time. After the system has communicated with all the groups 670, 680, 690, the system can continue communicating with the initial group 670.

The various solutions including the logical grouping, frequency division multiplexing, and time division multiplexing can be dynamically enabled or disabled by a scheduler. Each of the solutions described in this application negatively impacts the channel capacity. Consequently, the scheduler can monitor the quality of the communication in the system and can balance the channel interference versus the channel capacity. For example, scheduler A knows device A requires X data capacity and scheduler B knows device B needs Y data capacity. Based on these two known quantities, the schedules A and B can assign frequency resources to device A and device B for a subframe. In a more specific example, device A can get an entire subframe and device B can get the following subframe if required.

The scheduler can operate on a timeframe associated with the network 100. For example, if the network 100 is a 4G network, the schedule can make an adjustment to the system every millisecond. If the network 100 is a 5G network, the schedule can make an adjustment to the system every millisecond, every half a millisecond, or every eighth of a millisecond.

Figure 7:
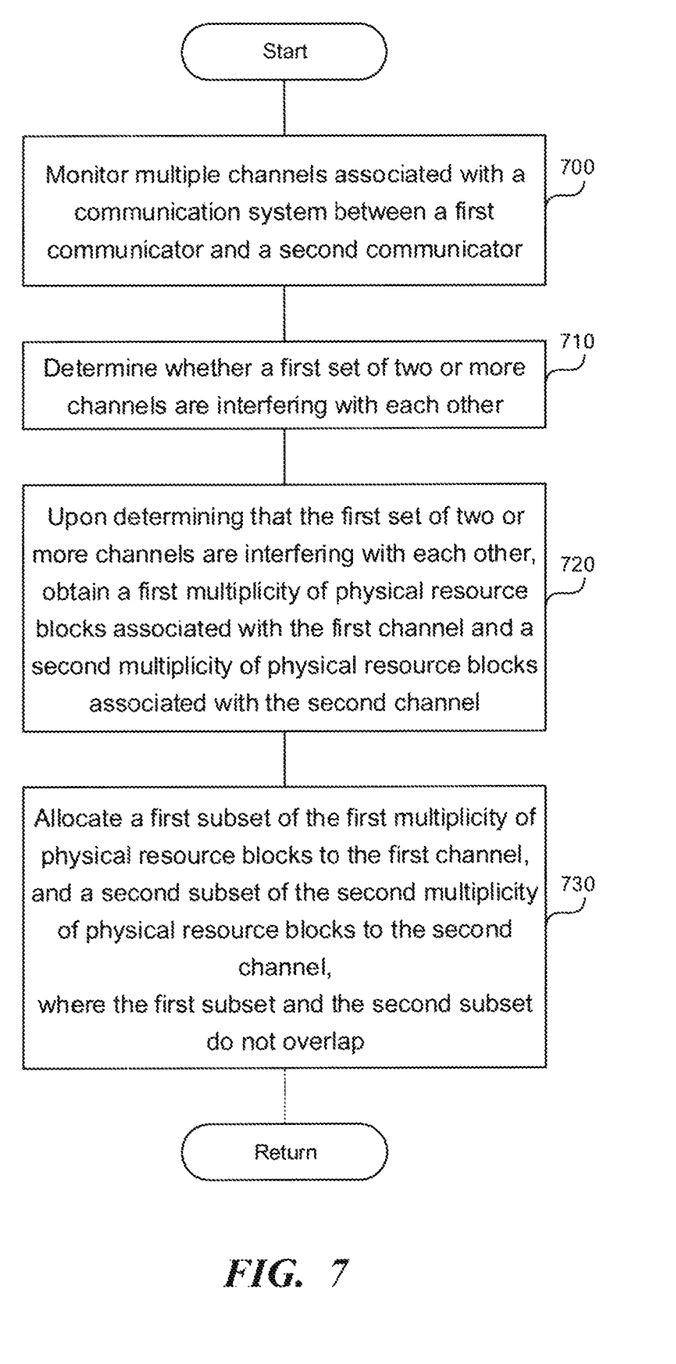
FIG. 7 is a flowchart of a method to reduce an interference between two or more channels enabling communication between a satellite and a wireless telecommunication network.

FIG. 7 is a flowchart of a method to reduce an interference between two or more channels enabling communication between a satellite and a wireless telecommunication network. In step 700, a hardware or software processor executing instructions described in this application can monitor multiple channels associated with wireless communications between a first communicator and a second communicator. The first communicator can emit multiple communications from one antenna, or from multiple closely spaced antennas. For example, the first communicator can be a satellite. At least a portion of the multiple channels can spatially overlap. The second communicator can be a wireless telecommunication network. While monitoring the multiple channels, the processor can determine whether the first set of two or more channels among the multiple channels are interfering with each other.

To detect interference, in one embodiment, the processor can determine the number of users in each channel, and the channel condition. The processor can track the number of active users, while the UE can report channel conditions through parameters such as signal-to-noise ratio, packet loss rate, wideband Channel Quality Indicator (CQI), sub-band CQI, etc. In another embodiment, the two schedulers associated with the two interfering channels can communicate with each other prior to the interference occurring, and can preemptively coordinate resource block use in the frequency domain. The first channel among the first set of two or more channels can carry a first communication, and the second channel among the first set of two or more channels can carry a second communication. The first communication and the second communication can be different.

In step 710, the processor can determine whether a first set of two or more channels are interfering with each other. If there is no interference, the processor does not need to make an adjustment, and allows the communication to proceed uninterrupted.

In step 720, upon determining that the first set of two or more channels are interfering with each other, the processor can obtain a first multiplicity of physical resource blocks associated with the first channel and a second multiplicity of physical resource blocks associated with the second channel. A physical resource block can include a frequency band of predetermined size, such as 180 kHz.

In step 730, the processor can allocate a first subset of the first multiplicity of physical resource blocks to the first channel, and a second subset of the second multiplicity of physical resource blocks to the second channel, where the first subset and the second subset do not overlap.

To reduce interference, the processor can determine whether a second set of two or more channels among the multiple channels are interfering with each other. Upon determining that the second set of two or more channels among the multiple channels are interfering with each other, the processor can group the first channel and the second channel by sending the same communication on the first channel and the second channel.

The processor can choose the method by which to reduce interference by determining the smallest impact on the network, such as by determining the smallest capacity impact on the network. The processor can determine a first capacity impact associated with grouping the first channel and the second channel, and a second capacity impact associated with allocating the first subset of the first multiplicity of physical resource blocks to the first channel, and the second subset of the second multiplicity of physical resource blocks to the second channel. The processor can determine whether the first capacity impact or the second capacity impact is greater. The processor can reduce a capacity impact by: upon determining that the first capacity impact is greater, favoring the allocating over the grouping; and upon determining that the second capacity impact is greater, favoring the grouping over the allocating.

The processor can perform time division multiplexing. The processor can obtain a second set of two or more channels among the multiple channels interfering with each other. The processor can determine a first subset of channels among the second set of two or more channels, and a second subset of channels among the second set of two or more channels. The first subset of channels and the second subset of channels do not interfere with each other even when the first subset of channels sends a first communication, and the second subset of channels sends a different communication. The processor can determine a first timeframe and a second timeframe, where the first timeframe and the second timeframe do not overlap. The processor can send the first communication to the first subset of channels during the first timeframe, and the second communication to the second subset of channels during the second timeframe.

The processor can perform time division multiplexing while reducing the impact on the capacity of the network. The processor can obtain a second set of two or more channels among the multiple channels interfering with each other. The processor can determine a first subset of channels among the second set of two or more channels, and a second subset of channels among the second set of two or more channels, where the first subset of channels and the second subset of channels do not interfere with each other, where the first subset of channels is configured to send a first communication, and the second subset of channels is configured to send a different communication. The processor can determine a first capacity associated with the first subset of channels, and a second capacity associated with the second subset of channels. Based on the first capacity and the second capacity, the processor can determine a first timeframe and a second timeframe, where the first timeframe and the second timeframe do not overlap. The first timeframe and the second timeframe can be of different lengths, and the channel with higher capacity can get a longer timeframe. The processor can send the first communication to the first subset of channels during the first timeframe. The processor can send the second communication to the second subset of channels during the second timeframe.

The processor can make adjustments to the network at the smallest timeframe available for the generation of wireless communication. For example, the processor can obtain a unit of time associated with communications carried by the second communicator, where a length of the unit of time depends on a generation of communication technology associated with the second communicator. For example, if the generation of wireless communication is 4G, the length of the unit of time is a millisecond. If the generation of the wireless communication is 5G, the length of the unit of time can be 1 millisecond, 0.5 milliseconds, or 0.125 milliseconds. The processor can make an adjustment to the wireless telecommunication network to reduce an interference between a first set of two or more channels in time increments corresponding to the unit of time.

Computer System

Figure 8:
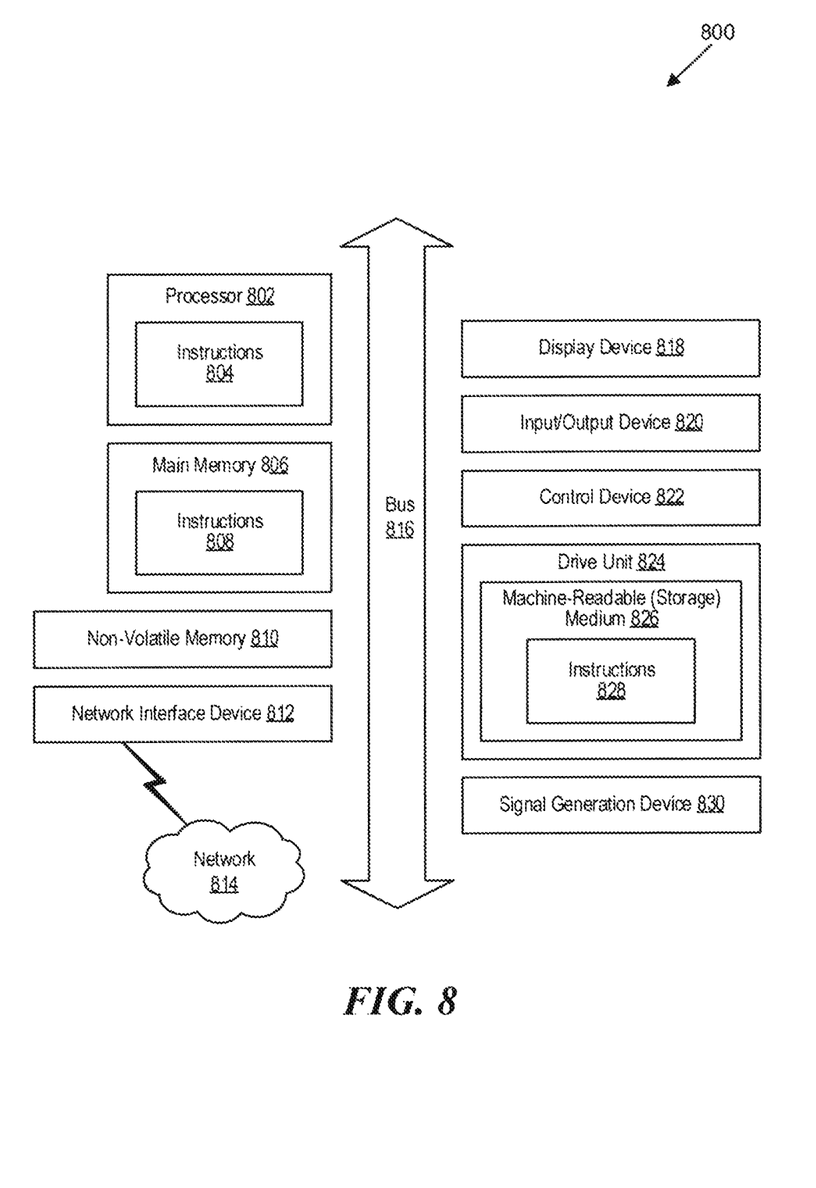
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, near real time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one computer-readable storage medium, excluding transitory signals and carrying instructions to reduce an interference between a first set of two or more channels enabling communication with a wireless telecommunication network, which, when executed by at least one data processor of a system, cause the system to:
monitor multiple channels used for wirelessly exchanging communications between a satellite and the wireless telecommunication network,
wherein a first channel among the first set of two or more channels carries a first communication,
wherein a second channel among the first set of two or more channels carries a second communication, and
wherein the first communication and the second communication are different;
determine whether the first set of two or more channels among the multiple channels are interfering with each other;
upon determining that the first set of two or more channels among the multiple channels are interfering with each other, group the first channel and the second channel by sending the first communication on the first channel and on the second channel;
determine whether a second set of two or more channels are interfering with each other, wherein the second set of two or more channels includes the grouped channel;
upon determining that the second set of two or more channels are interfering with each other, obtain a first multiplicity of physical resource blocks associated with the first channel and a second multiplicity of physical resource blocks associated with the second channel,
wherein a physical resource block of the first or second multiplicity of physical resource blocks includes a frequency band of predetermined size; and
allocate a first subset of the first multiplicity of physical resource blocks to the first channel, and a second subset of the second multiplicity of physical resource blocks to the second channel,
wherein the first subset and the second subset do not overlap.

2. The computer-readable storage medium of claim 1, comprising instructions to:
determine a first capacity impact associated with the grouping of the first channel and the second channel;
determine a second capacity impact associated with allocating the first subset of the first multiplicity of physical resource blocks to the first channel, and the second subset of the second multiplicity of physical resource blocks to the second channel;
determine whether the first capacity impact or the second capacity impact is greater; and
reduce a capacity impact associated with the wireless telecommunication network by:
upon determining that the first capacity impact is greater, favoring the allocating over the grouping; and
upon determining that the second capacity impact is greater, favoring the grouping over the allocating.

3. The computer-readable storage medium of claim 1, comprising instructions to:
obtain a third set of two or more channels among the multiple channels interfering with each other;
determine a first subset of channels among the third set of two or more channels, and a second subset of channels among the third set of two or more channels,
wherein the first subset of channels and the second subset of channels do not interfere with each other,
wherein the first subset of channels is configured to send a third communication,
wherein the second subset of channels is configured to send a fourth communication, and
wherein the third communication and the fourth communication are different from each other;
determine a first timeframe and a second timeframe, wherein the first timeframe and the second timeframe do not overlap; and
send the third communication to the first subset of channels during the first timeframe; and
send the fourth communication to the second subset of channels during the second timeframe.

4. The computer-readable storage medium of claim 1, comprising instructions to:
obtain a third set of two or more channels among the multiple channels interfering with each other;
determine a first subset of channels among the third set of two or more channels, and a second subset of channels among the third set of two or more channels,
wherein the first subset of channels and the second subset of channels do not interfere with each other,
wherein the first subset of channels is configured to send a third communication,
wherein the second subset of channels is configured to send a fourth communication, and
wherein the third communication and the fourth communication are different from each other;
determine a first capacity associated with the first subset of channels, and a second capacity associated with the second subset of channels;
based on the first capacity and the second capacity, determine a first timeframe and a second timeframe, wherein the first timeframe and the second timeframe do not overlap;
send the third communication to the first subset of channels during the first timeframe; and
send the fourth communication to the second subset of channels during the second timeframe.

5. The computer-readable storage medium of claim 1, comprising instructions to:
obtain a unit of time associated with communications carried by the wireless telecommunication network,
wherein a length of the unit of time depends on a generation of communication technology associated with the wireless telecommunication network; and
make an adjustment to the wireless telecommunication network to reduce the interference between the first set of two or more channels in time increments corresponding to the unit of time.

6. A system comprising:
at least one hardware processor; and at least one non-transitory memory storing instructions, which, when executed by the at least one hardware processor, cause the system to:
monitor multiple channels associated with wireless communication between a satellite and a second communicator,
wherein the satellite is configured to emit multiple communications associated with the multiple channels, and
wherein at least a portion of the multiple channels spatially overlap;
wherein a first channel among a first set of two or more channels carries a first communication,
wherein a second channel among the first set of two or more channels carries a second communication, and
wherein the first communication and the second communication are different;
detect mutual interference between the first set of two or more channels among the multiple channels;
group the first channel and the second channel by sending the first communication on the first channel and on the second channel;
determine whether a second set of two or more channels are interfering with each other, wherein the second set of two or more channels includes the grouped channel;
upon determining that the second set of two or more channels are interfering with each other, obtain a first multiplicity of physical resource blocks associated with the first channel and a second multiplicity of physical resource blocks associated with the second channel,
wherein a physical resource block of the first or second multiplicity of physical resource blocks comprises a frequency band of predetermined size; and
allocate a first subset of the first multiplicity of physical resource blocks to the first channel, and a second subset of the second multiplicity of physical resource blocks to the second channel,
wherein the first subset and the second subset do not overlap.

7. The system of claim 6, comprising instructions to:
determine a first capacity impact associated with grouping the first channel and the second channel;
determine a second capacity impact associated with allocating the first subset of the first multiplicity of physical resource blocks to the first channel, and the second subset of the second multiplicity of physical resource blocks to the second channel; and
determine whether the first capacity impact or the second capacity impact is greater; and
reduce a capacity impact associated with the second communicator by:
upon determining that the first capacity impact is greater, favoring the allocating over the grouping; and
upon determining that the second capacity impact is greater, favoring the grouping over the allocating.

8. The system of claim 6, comprising instructions to:
obtain a second set of two or more channels among the multiple channels interfering with each other;
determine a first subset of channels among the second set of two or more channels, and a second subset of channels among the second set of two or more channels,
wherein the first subset of channels and the second subset of channels do not interfere with each other,
wherein the first subset of channels is configured to send a third communication,
wherein the second subset of channels is configured to send a fourth communication, and
wherein the third communication and the fourth communication are different from each other;
determine a first timeframe and a second timeframe,
wherein the first timeframe and the second timeframe do not overlap; and
send the third communication to the first subset of channels during the first timeframe; and
send the fourth communication to the second subset of channels during the second timeframe.

9. The system of claim 6, comprising instructions to:
obtain a second set of two or more channels among the multiple channels interfering with each other;
determine a first subset of channels among the second set of two or more channels, and a second subset of channels among the second set of two or more channels,
wherein the first subset of channels and the second subset of channels do not interfere with each other,
wherein the first subset of channels is configured to send a third communication,
wherein the second subset of channels is configured to send a fourth communication, and
wherein the third communication and the fourth communication are different from each other;
determine a first capacity associated with the first subset of channels, and a second capacity associated with the second subset of channels;
based on the first capacity and the second capacity, determine a first timeframe and a second timeframe,
wherein the first timeframe and the second timeframe do not overlap; and
send the third communication to the first subset of channels during the first timeframe; and
send the fourth communication to the second subset of channels during the second timeframe.

10. The system of claim 6, comprising instructions to:
obtain a unit of time associated with communications carried by the second communicator,
wherein a length of the unit of time depends on a generation of communication technology associated with the second communicator; and
make an adjustment to a wireless telecommunication network to reduce an interference between the first set of two or more channels in time increments corresponding to the unit of time.

11. The system of claim 6, the satellite including one or more antennas in physical proximity with each other.

12. The system of claim 6, the second communicator including a wireless telecommunication network.

13. A system comprising:
at least one hardware processor; and
at least one non-transitory memory storing instructions, which, when executed by the at least one hardware processor, cause the system to:
determine whether two or more channels are interfering with each other,
wherein the two or more channels facilitate communication between a satellite and a second communicator, wherein the satellite is configured to emit multiple communications associated with the two or more channels, and wherein at least a portion of the two or more channels spatially overlap;

wherein a first channel among the two or more channels carries a first communication, wherein a second channel among the two or more channels carries a second communication, and wherein the first communication and the second communication are different;

upon determining the two or more channels are interfering with each other, group the first channel and the second channel by sending the first communication on the first channel and on the second channel;

determine whether the grouped channel and other channels of the two or more channels are interfering with each other, obtain a first multiplicity of physical resource blocks associated with the first channel and a second multiplicity of physical resource blocks associated with the second channel, wherein a physical resource block of the first or second multiplicity of physical resource blocks comprises a frequency band of predetermined size;

determine a first subset of channels among the two or more channels, and a second subset of channels among the two or more channels, wherein the first subset of channels and the second subset of channels do not interfere with each other, wherein the first subset of channels is configured to send the first communication, wherein the second subset of channels is configured to send the second communication, and wherein the first communication and the second communication are different from each other;

determine a first timeframe and a second timeframe, wherein the first timeframe and the second timeframe do not overlap; and send the first communication to the first subset of channels during the first timeframe; and send the second communication to the second subset of channels during the second timeframe.

14. The system of claim 13, comprising instructions to:

determine a first capacity impact associated with grouping the first channel and the second channel;

determine a second capacity impact associated with allocating a first subset of a first multiplicity of physical resource blocks to the first channel, and a second subset of a second multiplicity of physical resource blocks to the second channel, wherein a physical resource block in the first multiplicity of physical resource blocks associated with the first channel or the second multiplicity of physical resource blocks associated with the second channel comprises a frequency band of predetermined size; and determine whether the first capacity impact or the second capacity impact is greater; and reduce a capacity impact associated with the second communicator by:

upon determining that the first capacity impact is greater, favoring the allocating over the grouping; and upon determining that the second capacity impact is greater, favoring the grouping over the allocating.

15. The system of claim 13, comprising instructions to:

determine a first capacity associated with the first subset of channels, and a second capacity associated with the second subset of channels;

based on the first capacity and the second capacity, determine the first timeframe and the second timeframe, wherein the first timeframe and the second timeframe do not overlap; and send the first communication to the first subset of channels during the first timeframe; and send the second communication to the second subset of channels during the second timeframe.

16. The system of claim 13, comprising instructions to:

obtain a unit of time associated with communications carried by the second communicator, wherein a length of the unit of time depends on a generation of communication technology associated with the second communicator; and make an adjustment to a wireless telecommunication network to reduce an interference between the two or more channels in time increments corresponding to the unit of time.

17. The system of claim 13, the satellite including one or more antennas in physical proximity with each other.

* * * * *